(12) United States Patent
Painchaud et al.

(10) Patent No.: US 8,406,621 B2
(45) Date of Patent: Mar. 26, 2013

(54) METHOD AND APPARATUS FOR MEASURING A FACTOR CHARACTERIZING A BALANCED DETECTION DEVICE

(75) Inventors: Yves Painchaud, Québec (CA); Michel Poulin, Québec (CA); Michel Morin, Québec (CA)

(73) Assignee: Teraxion Inc., Quebec (CA)

( * ) Notice: Subject to any disclaimer, the term of this patent is extended or adjusted under 35 U.S.C. 154(b) by 333 days.

(21) Appl. No.: 12/916,137

(22) Filed: Oct. 29, 2010

(65) Prior Publication Data
US 2011/0129213 A1   Jun. 2, 2011

Related U.S. Application Data

(60) Provisional application No. 61/256,026, filed on Oct. 29, 2009.

(51) Int. Cl.
*H04B 17/00* (2006.01)
*H04B 10/08* (2006.01)

(52) U.S. Cl. ............... 398/25; 398/9; 398/16; 398/17; 398/24

(58) Field of Classification Search .......... 398/9, 16–27, 398/30–33, 202–207; 356/479–484; 375/254–257
See application file for complete search history.

(56) References Cited

U.S. PATENT DOCUMENTS

| 5,463,461 A * | 10/1995 | Horiuchi et al. ............. 356/484 |
| 6,859,586 B2 | 2/2005 | Epworth et al. |
| 2005/0135489 A1* | 6/2005 | Ho et al. ................. 375/257 |
| 2007/0297520 A1* | 12/2007 | Ho et al. ................. 375/254 |
| 2011/0228280 A1* | 9/2011 | Schmitt et al. ............. 356/479 |

OTHER PUBLICATIONS

Bach: "Ultra-broadband photodiodes and balanced detectors towards 100 Gbit/s and beyond", Proc. of SPIE, vol. 6014 60140B, 2005, pp. 1-13.*
Ultra-broadband photodiodes and balanced detectors towards 100 Gbit/s and beyond H.-G. Bach Proc. of SPIE, vol. 6014 60140B-1, 2005, pp. 1-13.
Dynamic Range of Single-Ended Detection Receivers for 100GE Coherent PM-QPSK A. Carena, V. Curri, P. Poggiolini and F. Forghieri IEEE Photonics Technology Letters, vol. 20, No. 15, Aug. 1, 2008, pp. 1281-1283.
Coherent Equalization and POLMUX-RZ-DQPSK for Robust 100-GE Transmission Chris R. S. Fludger, Thomas Duthel, Dirk van den Borne, Christoph Schulien, Ernst-Dieter Schmidt, Torsten Wuth, Jonas Geyer, Erik De Man, Giok-Djan Khoe and Huug de Waardt Journal of Lightwave Technology, vol. 26, No. 1, Jan. 1, 2008, pp. 64-72.
107-Gb/s full-ETDM transmission over field installed fiber using vestigial sideband modulation S. L. Jansen, R. H. Derksen, C. Schubert, X. Zhou, M. Birk, C.-J. Weiske, M. Bohn, D. van den Borne, P. M. Krummrich, M. Möller, F. Horst, B. J. Offrein, H. de Waardt, G. D. Khoe and A. Kirstädter Optical Society of America, 2006, 3 pages.
Coherent optical communication systems Kazuro Kikuchi Chapter 3 of Optical Fiber Telecommunications V, vol. B, by I.P. Kaminow, T. Li and A. E. Willner, Elsevier (2008) pp. 95-129.

(Continued)

*Primary Examiner* — Li Liu
(74) *Attorney, Agent, or Firm* — Finnegan, Henderson, Farabow, Garrett & Dunner LLP

(57) ABSTRACT

A method is provided for measuring a factor, called herein the single-port rejection ratio (SPRR), characterizing a balanced detection device. The SPRR is representative of the ratio of the weak differential output current measured under illumination of a single-port of the balanced detection device to the strong measurable differential output current obtained under dual-port illumination. An apparatus for measuring the SPRR is also provided.

17 Claims, 10 Drawing Sheets

OTHER PUBLICATIONS

Phase-Diversity Homodyne Detection of Multilevel Optical Modulation With Digital Carrier Phase Estimation Kazuro Kikuchi IEEE Journal of Selected Topics in Quantum Electronics, vol. 12, No. 4, Jul./Aug. 2006, pp. 563-570.

Experimental Analysis of 100Gb/s Coherent PDM-QPSK Long-Haul Transmission under Constraints of Typical Terrestrial Networks J. Renaudier, G. Charlet, O. Bertran Pardo, H. Mardoyan, P. Tran, M. Salsi and S. Bigo ECOC 2008, vol. 4, Brussels, Belgium, Sep. 21-25, 2008, pp. 61-62.

Digital Signal Processing Options in Long Haul Transmission Seb J. Savory Optical Society of America, 2007, 3 pages.

Multi-Rate (111-Gb/s, 2x43-Gb/s, and 8x10.7-Gb/s) Transmission at 50-GHz Channel Spacing over 1040-km Field-Deployed Fiber. T.J. Xia, G. Wellbrock, D. Peterson, W. Lee, M. Pollock, B. Basch, D. Chen, M. Freiberger, M. Alfiad, H. de Waardt, M. Kuschnerov, B. Lankl, T. Wuth, E.D. Schmidt, B. Spinnler, C.J. Weiske, E. de Man, C. Xie, D. van den Borne, M. Finkenzeller, S. Spaelter, R. Derksen, M. Rehman, J. Behel, J. Stachowiak and M. Chbat, ECOC 2008, vol. 4, Brussels, Belgium, Sep. 21-25, 2008, pp. 107-110.

Transmission of 107-Gb/s DQPSK over Verizon 504-km Commercial LambdaXtreme® Transport System T. J. Xia, G. Wellbrock, W. Lee, G. Lyons, P. Hofmann, T. Fisk, B. Basch, W. Kluge, J. Gatewood, P. J. Winzer, G. Raybon, T. Kissel, T. Carenza, A. H. Gnauck, A. Adamiecki, D. A. Fishman, N. M. Denkin, C. R. Doerr, M. Duelk, T. Kawanishi, K. Higuma, Y. Painchaud and C. Paquet. OFC/NFOEC, 2008, 4 pages.

Polarization Demultiplexing Based on Independent Component Analysis in Optical Coherent Receivers H. Zhang, Z. Tao, L. Liu, S. Oda, T. Hoshida, J. C. Rasmussen ECOC 2008, vol. 1, Brussels, Belgium, Sep. 21-25, 2008, pp. 41-42.

Performance of balanced detection in a coherent receiver Yves Painchaud, Michel Poulin, Michel Morin and Michel Têtu Optics Express, vol. 17, No. 5, Mar. 2, 2009, pp. 3659-3672.

* cited by examiner

METHOD AND APPARATUS FOR MEASURING A FACTOR CHARACTERIZING A BALANCED DETECTION DEVICE

CROSS REFERENCE TO RELATED APPLICATION

This application claims the benefit of U.S. Provisional Application No. 61/256,026, filed Oct. 29, 2009, the content of which is incorporated herein by reference.

FIELD OF THE INVENTION

The present invention relates to the field of coherent detection and more particularly concerns a method for characterizing a balanced detection device. The present invention also encompasses an apparatus for testing and qualifying optical receivers using balanced detection.

BACKGROUND

In response to the ever increasing demand in transmission capacity, telecommunication systems for operation at 100 Gb/s are already under development. An important challenge at such high speed transmission is the spectral efficiency required to increase the transmission capacity over existing transmission is links. New approaches based on coherent detection appear as the most promising. They enable polarization multiplexing and the mitigation of transmission impairments through digital signal processing in the electrical domain.

In coherent detection, the optical signal is demodulated by mixing with a reference, the ensuing beats being detected by photodiodes [K. Kikuchi, "Coherent optical communication systems," Chapter 3 of Optical Fiber Telecommunications V, Volume B, by I. P. Kaminow, T. Li and A. E. Willner, Elsevier (2008)]. The resulting electrical signals are further digitized and processed in the electrical domain. The mixing and detection are achieved using an assembly of optical and optoelectronics components such as shown in FIG. 1. This assembly is referred to as the optical front-end (OFE) of the coherent receiver.

The purpose of the optical front end illustrated in FIG. 1 is to provide four electrical signals allowing the determination of the amplitude, phase and polarization of the optical signal $E_s$. It separates the incoming signal $E_s$ and a reference field produced by a local oscillator $E_{LO}$ into x and y polarization components that are properly aligned for maximum interference and fed into two 90° optical hybrid mixers. These mixers provide in-phase and quadrature signals allowing unambiguous determination of the amplitude and phase of each polarization component $E_{sx}$ and $E_{sy}$. The beats between the signal polarization components and the reference field are detected by photodiodes. Resulting photocurrents are amplified and converted to output voltages ($I_x$, $Q_x$, $I_y$, $Q_y$) using linear transimpedance amplifiers (TIA). These voltages can then be digitized and processed to mitigate transmission impairments and decode the incoming signal.

The polarization management function is illustrated schematically by two polarization beam splitters in the drawing of FIG. 1. Actual implementation may differ. For example, the signal LO from the local oscillator is in general linearly polarized and can be separated into linearly polarized components of equal amplitude by a 3 dB splitter. Further components may be required to ensure proper alignment of the signal and reference fields. Moreover, the polarization management and mixing functions can be intertwined to some extent. For example, the reference field can be transformed into a circularly polarized field in order to ensure the quadrature condition.

In principle, two beat signals in quadrature are sufficient to unambiguously determine the amplitude and phase of an optical field. Two optical outputs from each hybrid with beats in quadrature (e.g $E_{sx}+E_{LO}$ and $E_{sx}+jE_{LO}$) could each be detected with a single photodiode to determine the amplitude and phase of the signal. However, important noise terms are not eliminated through this process, and careful adjustment of the signal and local oscillator powers is necessary to avoid severe system impairment [see U.S. Pat. No. 6,859,586 (EP-WORTH et al) and Carena, V. Curri, P. Poggiolini and F. Forghieri, "Dynamic range of single-ended detection receivers for 100GE Coherent PM-QPSK," IEEE Photon. Technol. Lett., 20, 1281-1283 (2008)]. The intensity resulting from the mixing of two optical fields is given by the sum of the individual field intensities and a beat signal carrying the useful phase information. Preferably, the detection process should reject the individual intensity contributions and retain only the useful beat intensities. This is realized with balanced detection as illustrated in FIG. 1. Mixed optical intensities carrying the same individual intensities but beats that are out of phase by π are detected differentially by balanced photodetectors. Individual intensities are thus subtracted, whereas the beat intensities are added, doubling the amplitude of the meaningful photocurrent. Balanced detection thus allows using all of the received signal power for detection, while rejecting common-mode signals. Compared to single-ended detection, the use of balanced detection provides higher optical power dynamic range and longer reaches.

In balanced detection, two optical signals are detected using similar photodiodes. The resulting photocurrents are amplified differentially in order to produce an electrical signal proportional to their difference. The aim of this differential detection is to highlight the difference between similar optical signals by rejecting their common part. It is know in the art to quantify the ability of a pair of balanced photodetectors to perform this rejection by a factor called the common mode rejection ratio (CMRR), as for example explained in G. Bach, "Ultra-broadband photodiodes and balanced detectors towards 100 Gbit/s and beyond," Proc. of SPIE v.6014, 60140B (2005). It corresponds to the ratio of the weak signal measured under equal illumination of both detectors and the strong signal measured when a single detector is illuminated. FIGS. 2A, 2B and 2C (PRIOR ART) depicts the three illumination conditions required to measure the CMRR. Under dual-photodiode illumination with the same optical power (FIG. 2A), a weak photocurrent $\Delta I$ is measured while strong photocurrents $I_1$ and $-I_2$ are detected under single-photodiode illumination (FIGS. 2B and 2C). The CMRR is defined here as the ratio of these values:

$$CMRR = \frac{|\Delta I|}{|I_1| + |I_2|} \quad (1)$$

It qualifies the similarity of the photodiodes (responsivity, polarization dependence, frequency response) by quantifying the relative weakness of the output electric signal under equal illumination. The CMRR definition is simple and its measurement appears straightforward but does require some care. Nonlinearity can render the CMRR power dependent. Measurements should thus be carried out with the same power incident on each photodiode surface as illustrated in FIG. 2. Moreover, the frequency response of the photodiodes may differ, rendering the CMRR dependent on the modulation frequency of the incident power. Typically, the CMRR of balanced photodetectors is specified as a function of frequency.

One practical issue with the use of the CMRR is that photocurrents $I_1$ and $I_2$ of individual photodiodes cannot be measured without physically blocking the light otherwise reaching a photodiode. This is not possible, in general, when characterizing a coherent receiver OFE in which the photodiodes and the optical mixer are integrated and connected, for example using optical fibers. There is therefore a need for an improved method for characterizing the performance of a balanced detection system and an apparatus implementing such method.

SUMMARY OF THE INVENTION

In accordance with one aspect of the invention, there is provided a method for measuring a factor characterizing a balanced detection device. The balanced detection device is understood to include a pair of input waveguides, a pair of output waveguides respectively connected to a pair of photodiodes coupled to generate a differential output current, and an optical mixing element coupling light between the input waveguides and the output waveguides. The method includes the following steps of:

a) injecting a pair of modulated dual-port test signals in the pair of input waveguides, respectively. The dual-port test signals have a same optical power and have a relative phase $\phi$ therebetween;
b) measuring the differential output current of the photodiodes for values of the relative phase $\phi$ corresponding to light primarily reaching each one of the photodiodes. In this manner, maximized differential output currents $\Delta I_1$ and $\Delta I_2$ are obtained;
c) injecting a modulated single-port test signal in a single one of the input waveguides. The single-port test signal has an optical power corresponding to four times the optical power of each of the dual-port test signals. The corresponding differential output current is then measured, and a single-port differential output current $\Delta I_0$ is obtained; and
d) calculating a single-port rejection ratio SPRR corresponding to the ratio of the single-port differential output current $\Delta I_0$ to the sum of the maximized differential output currents $\Delta I_1$ and $\Delta I_2$.

The method above is particularly appropriate for characterizing coherent receivers where the optical mixing element is embodied by an optical hybrid mixer.

In accordance with another aspect of the present invention, there is also provided an apparatus for measuring a factor characterizing a balanced detection device, the balanced detection device including a pair of input waveguides, a pair of output waveguides respectively connected to a pair of photodiodes coupled to generate a differential output current, and an optical mixing element coupling light between the input waveguides and the output waveguides.

The apparatus includes an optical assembly having a light source assembly for generating a modulated seed light signal, a splitter for splitting the modulated seed light signal into two light components thereof, first and second signal branches having inputs connected to the splitter for respectively receiving the components of the modulated seed light signal therefrom and outputs operatively connectable the pair of input waveguides of the balanced detection device. The optical assembly further includes a phase modulator provided in one of the first and second branches for varying a phase of the light component therein.

The apparatus further includes a controller connectable to the balanced detection device to receive therefrom the differential output current. The controller controls the optical assembly to perform the following steps:
a) injecting, via an optical assembly, a pair of modulated dual-ports test signals in the pair of input waveguides, respectively, the dual-ports test signals having a same optical power and a relative phase $\phi$ therebetween;
b) measuring the differential output current of the photodiodes for values of the relative phase $\phi$ corresponding to light primarily reaching each one of the photodiodes, thereby obtaining maximized differential output currents $\Delta I_1$ and $\Delta I_2$;
c) injecting, via said optical assembly, a modulated single-port test signal in a single one of the input waveguides, the single-port test signal having an optical power corresponding to four times the optical power of each of the dual-port test signals, and measuring the corresponding differential output current, thereby obtaining a single-port differential output current $\Delta I_0$; and
d) calculating a single-port rejection ratio SPRR corresponding to the ratio of the single-port differential output current $\Delta I_0$ to the sum of the maximized differential output currents $\Delta I_1$ and $\Delta I_2$.

Other features and advantages of the present invention will be better understood upon a reading of preferred embodiments thereof, with reference to the appended drawings.

DESCRIPTION OF PREFERRED EMBODIMENTS OF THE INVENTION

The present invention generally relates to a method an apparatus for characterizing a balanced detection device.

The expression "balanced detection device" is understood to refer to any assembly of components where a pair of input signals are combined to produce a pair of output signals carrying the same individual intensities but beats that are out of phase, the output signals being detected differentially by balanced photodiodes. Individual intensities are thus subtracted, whereas the beat intensities are added, doubling the amplitude of the meaningful photocurrent. Balanced detection thus allows using all of the received signal power for detection, while rejecting common-mode signals.

Figure 3:
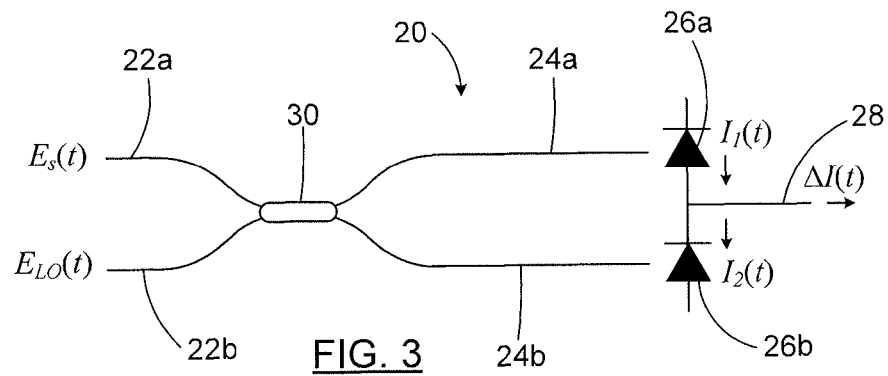
FIG. 3 schematically illustrates a balanced detection device of simple configuration.

Referring to FIG. 3, a balanced detection device 20 of a simple construction is illustrated. The balanced detection device 20 includes a pair of input waveguides 22a and 22b, a pair of output waveguides 24a and 24b respectively connected to a pair of photodiodes 26a and 26b coupled to generate a differential output current 28. An optical mixing element 30 couples light between the input waveguides 22a and 22b and the output waveguides 24a and 24b. The light outputted by each output waveguide 24a and 24b is a mix of the signal injected in both input waveguides 22a and 22b. In the illustrated embodiment, the optical mixing element 30 is a 3 dB coupler in which an optical signal of interest $E_s(t)$ is mixed with a local oscillator field $E_{LO}(t)$.

As one skilled in the art will readily understand, balanced detection devices such as those used for coherent detection can differ from the simple embodiment shown in FIG. 3. For example, in the typical optical front end shown in FIG. 1, the illustrated balanced detection device includes a plurality of pairs of input waveguides 22a and 22b, output waveguides 24a and 24b and photodiodes 26a and 26b, mixed in various fashions by two optical mixing elements 30 here embodied by 90° optical hybrid mixers. As will be apparent from the description below, the method of the present invention may be applied to any and all combinations of pairs of input waveguides 22a and 22b and output waveguides 24a and 24b of such a balanced detection device 30 coupled together by one of the optical mixing elements 30.

The expression "waveguide" is understood herein to refer any appropriate light-guiding structures such as optical fibers or planar or channel waveguides. The photodiodes may be embodied by any device apt to convert light into an electrical current. The optical mixing element may be embodied by any device or assembly of devices combining input light signals to provide mixed output light signals, such as optical couplers and hybrid mixers.

Definition of the SPRR

Theoretically, in a balanced detection device 20 such as the one shown in FIG. 3, the input optical fields can be written in terms of their powers, frequencies and phases:

$$E_s(t) = \sqrt{P_s(t)} \cdot \exp(j\phi_s(t)) \cdot \exp(j\omega_s t), \quad (2)$$

$$E_{LO}(t) = \sqrt{P_{LO}(t)} \cdot \exp(j\phi_{LO}(t)) \cdot \exp(j\omega_{LO} t) \quad (3)$$

Assuming a 3 dB coupler with a perfect 50/50 power splitting and photodiodes with an identical responsivity R, the output photocurrents measured by the photodiodes 26a and 26b are respectively given by:

$$I_1(t) = \frac{R}{2}\{P_s(t) + P_{LO}(t) + \quad (4)$$
$$2\sqrt{P_s(t)P_{LO}(t)} \cdot \sin((\omega_s - \omega_{LO}) \cdot t + \phi_s(t) - \phi_{LO}(t))\},$$

$$I_2(t) = \frac{R}{2}\{P_s(t) + P_{LO}(t) - \quad (5)$$
$$2\sqrt{P_s(t)P_{LO}(t)} \cdot \sin((\omega_s - \omega_{LO}) \cdot t + \phi_s(t) - \phi_{LO}(t))\}.$$

Each photocurrent comprises three contributions. The first two are proportional to the individual power of each interfering field, while the third one is proportional to an interference term dependent on the relative phase between the fields. When the fields are at different optical frequencies, this interference term oscillates at the beat frequency $\omega_s - \omega_{LO}$. The photodiodes are connected together to provide the differential output current:

$$\Delta I(t) = I_1(t) - I_2(t) = 2R$$
$$\sqrt{P_s(t)P_{LO}(t)} \cdot \sin((\omega_s - \omega_{LO}) \cdot t + \phi_s(t) - \phi_{LO}(t)). \quad (6)$$

Ideal balanced detection thus doubles the photocurrent associated to the interference beats while rejecting those associated to the individual optical field powers.

Figure 2A:
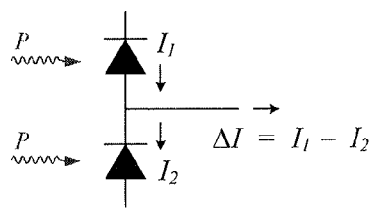
FIGS. 2A, 2B and 2C (PRIOR ART) schematically illustrates the illumination conditions for determining the CMRR of a pair of balanced photodiodes, respectively under dual-photodiode illumination (FIG. 2A) and single-photodiode illumination (FIGS. 2B and 2C).
Figure 2B:
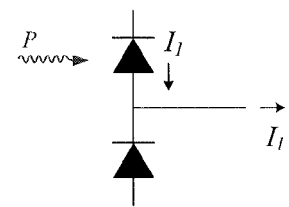
Figure 2C:
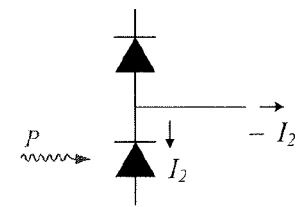
Figure 4:
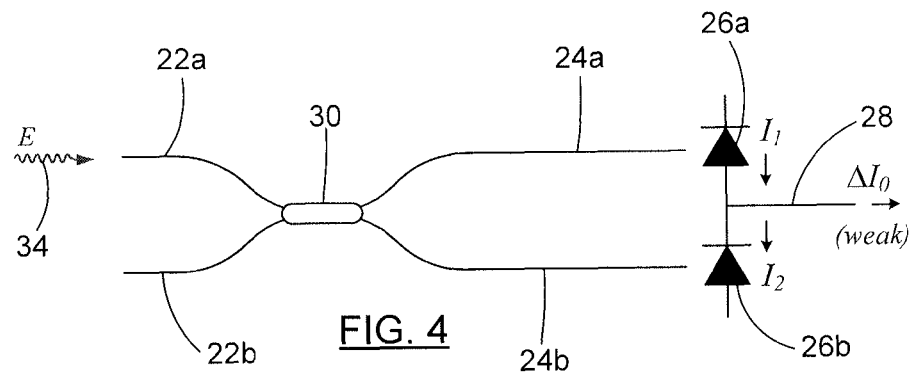
FIG. 4 illustrates a step of injecting a single-port test signal in the balanced detection device of FIG. 3.
Figure 5:
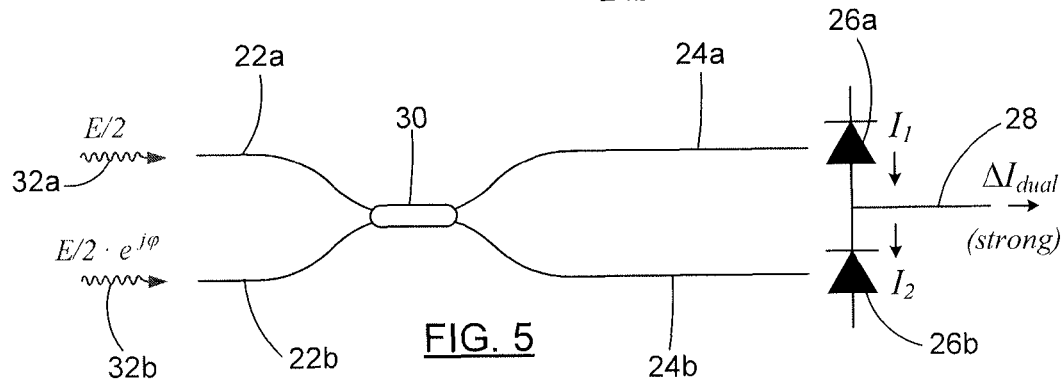
FIG. 5 illustrates a step of injecting dual-port test signals in the balanced detection device of FIG. 3.

This rejection of the interfering field individual powers is a main benefit of balanced detection, especially in coherent receivers, and needs to be characterized. As aforementioned, it has been suggested to use the CMRR for this purpose, which compares the weak signal under dual-photodiode illumination of equal power to the strong signals under single-photodiode illumination, as expressed in Eq. (1). In the context of coherent detection, it may however be more appropriate to define a parameter that quantifies the weakness of the output differential current under illumination through a single optical input waveguide 22a, as illustrated in FIG. 4. The question here is "weak" relative to what? In the configuration of FIG. 4, photocurrents $I_1$ and $I_2$ of individual photodiodes 26a and 26b cannot be measured without blocking the light in one output waveguide 24a and 24b of the device 20. This is not possible, in general, when characterizing a coherent receiver OFE in which the photodiodes 26a and 26b and the optical mixing element 30 are integrated and individually inaccessible. It is more convenient to compare the weak signal measured under the configuration shown in FIG. 4 to the strong signal measured under the configuration shown in FIG. 5. In this new configuration, two optical fields having the same amplitude are launched into the coupler. Depending on their relative phase, a strong output signal can be generated. Assuming a perfect 3 dB coupler, the relative phase φ can be adjusted such that all the light reaches a single photodiode, thus replicating the conditions of the single-photodiode illumination of FIG. 2. Furthermore, the optical field amplitude in FIG. 5 is half that in FIG. 4 in order to illuminate the photodiodes with the same optical power. For an arbitrary coupler, depending on the phase φ of FIG. 5, the differential output current $\Delta I_{dual}$ is somewhere between two extreme values of strong amplitude:

$$-|\Delta I_2| \leq \Delta I_{dual} \leq |\Delta I_1|, \quad (7)$$

where $\Delta I_1$ or $\Delta I_2$ is the differential output current measured when φ is such that the power incident on the corresponding photodiode is maximized.

Thus, referring to FIG. 4, FIG. 5 and Eq. (7), a single-port rejection ratio (SPRR) is defined as the ratio of the weak photocurrent under single-port, $\Delta I_0$, illumination to the strong measurable photocurrents $\Delta I_1$ and $\Delta I_2$ under dual-port illumination:

$$SPRR = \frac{|\Delta I_0|}{|\Delta I_1| + |\Delta I_2|}. \quad (8)$$

This definition looks quite similar to the CMRR but there are important distinctions. The SPRR is representative not only of unequal responsivities of the photodiodes, but also of an uneven split of the input power by the coupler. Furthermore, the SPRR measured with one input port is not necessarily equal to that measured with the other input port. For example, it may happen that unequal photodiode responsivities compensate for an uneven split by the coupler such that the differential current $\Delta I_0$ measured from one input port vanishes. Both defects will however add-up when measuring $\Delta I_0$ from the other input port. Finally, the SPRR is better adapted to coherent detection in that, referring to Eqs. (4) to (6), it compares the weak photocurrent associated to an individual input optical power, which needs to be rejected, to the strong photocurrent proportional to the interference term that needs to be highlighted by the balanced detection. Notwithstanding these differences, the value of the SPRR becomes equivalent to the CMRR as the characteristics of the optics approach ideal ones such that dual photocurrents $\Delta I_1$ and $\Delta I_2$ approach photocurrents $I_1$ and $I_2$ in individual photodiodes.

Method for Measuring a Factor Characterizing a Balanced Detection Device

In accordance with an aspect of the invention, there is therefore provided a method for measuring a factor characterizing a balanced detection device, i.e. the SPRR explained above. A simple embodiment of this method is best understood with reference to FIGS. 4 and 5, where a balanced detection device 20 of a same construction as the device 20 of FIG. 3, is shown, and therefore includes a pair of input waveguides 22a and 22b, a pair of output waveguides 24a and 24b respectively connected to a pair of photodiodes 26a and 26b coupled to generate a differential output current 28, and an optical mixing element 30 coupling light between the input waveguides 22a and 22b and the output waveguides 24a and 24b.

Referring more particularly to FIG. 5, the method includes a step of injecting a pair of modulated dual-port test signals 32a and 32b in the pair of input waveguides 22a and 22b, respectively. This injecting can be performed by any appropriate optical assembly, i.e. any device or combination of devices which is apt to generate light, modify its optical properties as may be required, and input such light within the balanced detection device for propagation into the input waveguides 22a and 22b. The dual-port test signals 32a and 32b have equivalent optical field amplitudes E/2 and a relative phase $\phi$ therebetween. The differential output current 28 of the photodiodes 26a and 26b is then measured, by any appropriate current detector as well known in the art, for values of the relative phase $\phi$ corresponding to light primarily reaching each one of the photodiodes 26a and 26b. In other words, by measuring the different output currents under various relative phase $\phi$, the maximized differential output currents $\Delta I_1$ and $\Delta I_2$ can be obtained as corresponding to the largest positive and negative values respectively.

With particular reference to FIG. 4, the method also includes injecting, via the optical assembly, a modulated single-port test signal 34 in a single one of the input waveguides, shown as input waveguide 22a in the illustrated example. The single-port test signal 34 has an optical field amplitude E corresponding to twice the optical field amplitude E/2 of the dual-port test signals 32a and 32b. Thus it corresponds to an optical power for the single-port test signal 34 which is four times the optical power of each dual-port test signal 32a or 32b, since, by definition, the optical power corresponds to the square of the optical field amplitude. This ensures illuminating the photodiodes with the same optical powers as in FIG. 2 in the particular case where the optical phase $\phi$ in the setup of FIG. 5 is adjusted such as transmitting all the optical power to only one of the photodiode.

The corresponding differential output current 28 is measured, thereby obtaining a single-port differential output current $\Delta I_0$.

As one skilled in the art will readily understand, the injecting steps above could be performed in any particular order without departing from the scope of the present invention.

The single-port rejection ratio SPRR can then be calculated according to equation (8) above, i.e. calculating the ratio of the single-port differential output current $\Delta I_0$ to the sum of the maximized differential output currents $\Delta I_1$ and $\Delta I_2$.

As explained above, and as its name indicated, the single-port rejection ratio (SPRR) is representative of the ratio of the weak photocurrent under illumination of a single-port, i.e. a single input waveguide, to the strong measurable photocurrents under illumination of both input waveguides. It will therefore be understood that the value obtained for the SPRR is directly associated to the input waveguide in which the single-port test signal is injected. For a full characterisation of a given balanced detection device, the method preferably includes performing, sequentially, the step of injecting a single-port test signal 34 in each of the input waveguide 22a and 22b, and performing the calculating of the SPRR using each of the measured single-port differential output current 28. A value for the SPRR associated with each input waveguide 22a and 22b is therefore obtained.

Application to the Optical Front-End of a Coherent Receiver

Figure 1:
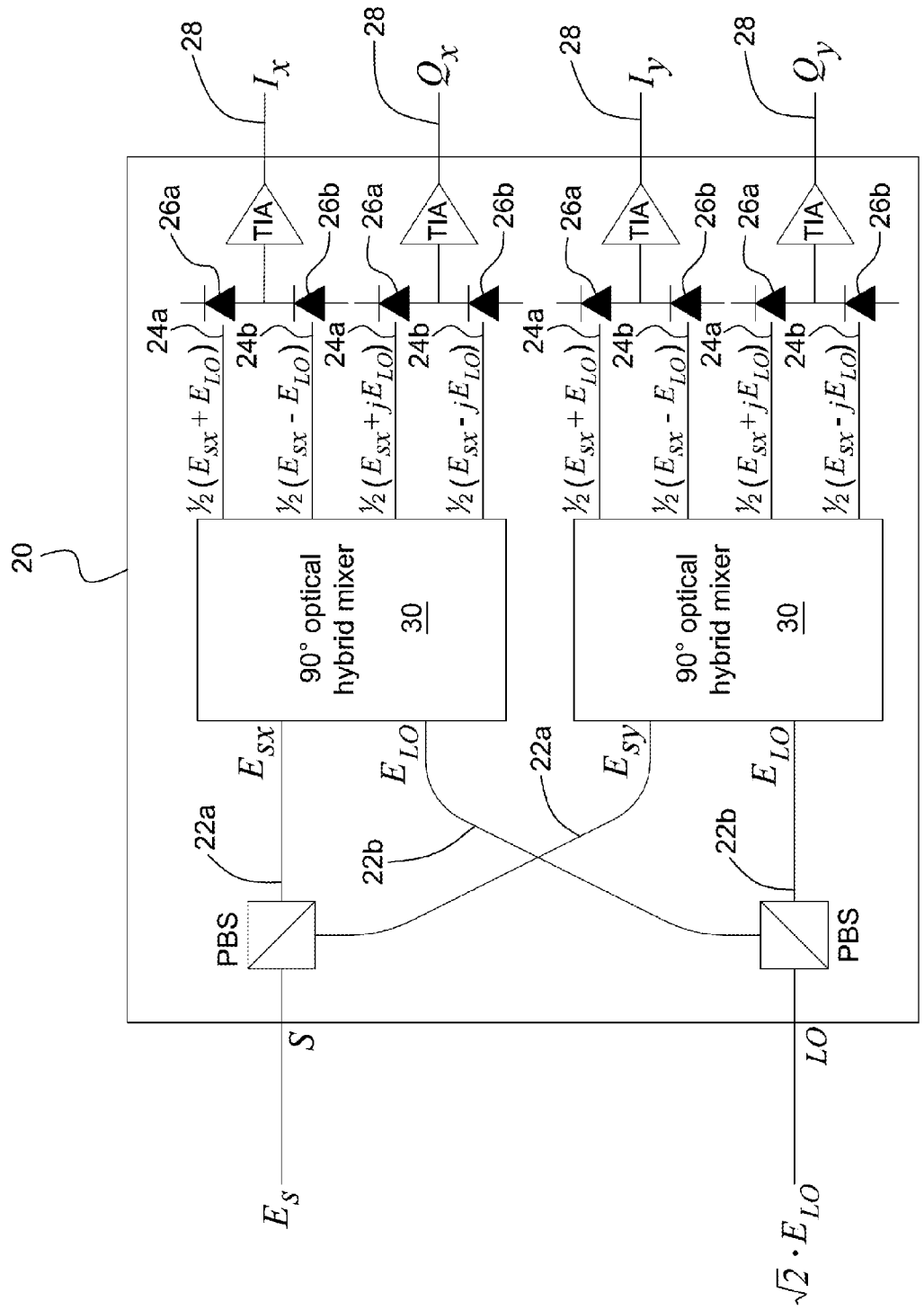
FIG. 1 is a schematic representation of a typical optical front-end (OFE) such as found in a coherent receiver.

Although the SPRR is explained above with reference to the simple design of the balanced detection device of FIGS. 3 to 5, it also applies to more complex designs, such as the complete optical front-end (OFE) shown in FIG. 1, which includes a plurality of pairs of input waveguides 22a and 22b, output waveguides 24a and 24b and photodiodes 26a and 26b, connected to two optical hybrid mixers respectively associated with x and y polarization stages. In this case, eight SPRR values quantify the weakness of the output signals ($I_x$, $Q_x$, $I_y$, $Q_y$) under illumination from a single input port S or LO with respect to their amplitude under illumination from both input ports S and LO. Each of these SPRR values can be obtained using the steps of the method defined above. It will be noted that in the context of such a device, the notion of "port" differs from the notion of "input waveguide", as the signal from each input port S and LO is divided into two input waveguides (input waveguides 22a for port S and input waveguides 22b for port LO) respectively connected to one of the two optical mixing elements 30 of the device. One skilled in the art will know to adapt the power of the dual-port test signals and single-port test signal to take this factor into consideration and ensure the proper ratio of the power of the signals actually injected in the input waveguides.

Within the OFE shown in FIG. 1, the mixing and splitting of the input optical signals is performed by the 90° optical hybrid mixers, embodying mixing elements 30 of the balanced detection device 20 more complex than the one of FIG. 3. This part of the OFE is replicated in FIG. 6, where $E_1(t)$ to $E_4(t)$ represent the optical fields at the photodiodes 26a and 26b of a given pair for the input conditions shown. The input waveguides 22a and 22b respectively receive optical signals from input ports S and LO of the OFE, embodying the dual-port test signals 32a and 32b of the method described above. The output fields can be written as:

$$E_1(t)=a_{s1}E_s(t-\tau_{s1})+a_{L1}e^{j\phi}E_s(t-\tau-\tau_{L1}), \quad (9)$$

$$E_2(t)=a_{s2}E_s(t-\tau_{s2})+a_{L2}e^{j\phi}E_s(t-\tau-\tau_{L2}), \quad (10)$$

$$E_3(t)=a_{s3}E_s(t-\tau_{s3})+a_{L3}e^{j\phi}E_s(t-\tau-\tau_{L3}), \quad (11)$$

$$E_4(t)=a_{s4}E_s(t-\tau_{s4})+a_{L4}e^{j\phi}E_s(t-\tau-\tau_{L4}), \quad (12)$$

where $a_{si}$ and $a_{Li}$ are coupling coefficients between input ports S or LO and the four output ports, whereas $\tau_{si}$ and $\tau_{Li}$ are the time delays from input port S or LO to the four outputs. It is to be noted that is such a configuration, the optical hybrid mixer couples light from two input waveguides 22a and 22b into four output waveguides 24a, 24b, 24a' and 24b'.

Figure 6:
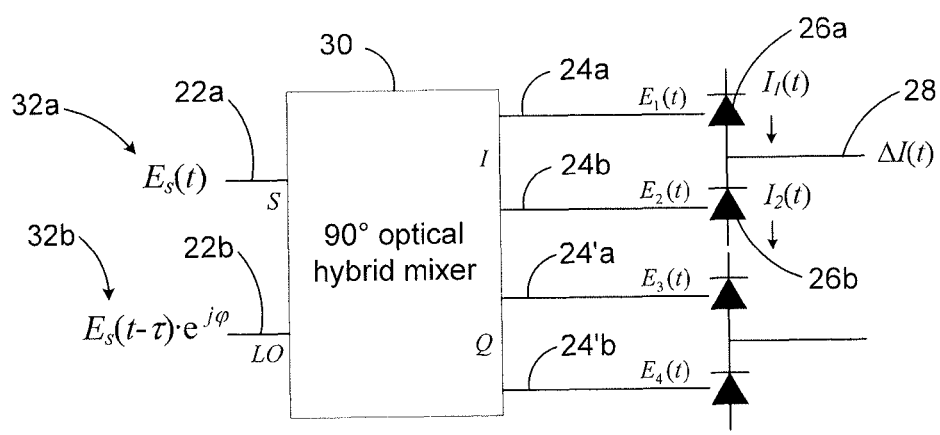
FIG. 6 schematically illustrates another embodiment of a balanced detection device where signals are mixed by a 90° optical hybrid mixer.

The time delay $\tau$ shown in FIG. 6, applied to one of the dual-port test signals 32b, may serve at compensating for a possible differential delay between the two dual-port test signals reaching the optical hybrid mixer 30. It is assumed that it can be adjusted such that:

$$\tau+\tau_{Li}=\tau_{si}, \quad (13)$$

for all paths simultaneously.

Looking at the upper pair of output waveguides 24a and 24b and the corresponding pair of photodiodes 26a and 26b, assuming photodiodes of equal responsivity R, the differential output current 28 is given by:

$$\Delta I(t)=R|E_s(t-\tau_{s1})|^2 \cdot (|a_{s1}|^2+|a_{L1}|^2 2|a_{s1}||a_{L1}|\cos\theta)-R|E_s(t-\tau_{s2})|^2 \cdot (|a_{s2}|^2+|a_{L2}|^2 2|a_{s2}||a_{L2}|\cos\theta) \quad (14)$$

where $$\theta=\phi+\arg(a_{L1})-\arg(a_{s1})=\phi+\arg(a_{L2})-\arg(a_{s2}). \quad (15)$$

The phase $\phi$ can be chosen to maximize or minimize the differential output current 28. Using the same nomenclature as above, the maximized differential output currents $\Delta I_1(t)$ and $\Delta I_2(t)$ are defined as the value of $\Delta I(t)$ when the relative phase co is adjusted such that $\cos\theta=+1$ or $-1$ respectively:

$$\Delta I_1(t)=R\{|E_s(t-\tau_{s1})|^2 \cdot (|a_{s1}|+|a_{L1}|)^2-|E_s(t-\tau_{s2})|^2 \cdot (|a_{s2}|-|a_{L2}|)^2\}, \quad (16)$$

$$\Delta I_2(t)=R\{|E_s(t-\tau_{s1})|^2 \cdot (|a_{s1}|+|a_{L1}|)^2-|E_s(t-\tau_{s2})|^2 \cdot (|a_{s2}|-|a_{L2}|)^2\}. \quad (17)$$

Assuming that coefficients $a_{si}$ and $a_{Li}$ are of similar amplitudes, the following approximations can be made:

$$\Delta I_1(t) \approx R \cdot |E_s(t-\tau_{s1})|^2 \cdot (|a_{s1}|+|a_{L1}|)^2, \quad (18)$$

$$\Delta I_2(t) \approx R \cdot |E_s(t-\tau_{s2})|^2 \cdot (|a_{s2}|+|a_{L2}|)^2. \quad (19)$$

Equations (18) and (19) provide expressions for the two strong photocurrents discussed above, thus allowing calculation of the denominator of the SPRR as defined in Eq. (8). To find the numerator of the SPRR for a give input waveguide, for example input waveguide 22a, there must be no signal at port LO and twice the field amplitude at port S to meet the conditions of FIGS. 4 and 5. Mathematically, this can be represented by Eq. (14) in which field $E_s$ is doubled and coefficients $a_{Li}$ are put to 0. One then obtains $\Delta I_0(t)$ defined as the value of $\Delta I(t)$ under this single-port condition:

$$\Delta I_0(t)=4R\cdot\{|a_{s1}|^2 \cdot |E_s(t-\tau_{s1})|^2-|a_{s2}|^2 \cdot |E_s(t-\tau_{s2})|^2\}. \quad (20)$$

Using the last three expressions, the SPRR can be calculated according to definition (8).

An embodiment of the method of the invention which can be used to measure the SPRR of a complete OFE will now be explained with particular reference to FIGS. 8A and 8B. An apparatus 36 which can be used to implement this method is also shown.

The apparatus 36 preferably includes an optical assembly 37, in which is provided a light source assembly 38 for generating a modulated seed light signal 43. The light source assembly 38 is here shown as including a laser source 39, such as for example a semiconductor laser generating a seed light signal 40 and followed by an amplitude modulator 41 which imposes a modulation to the seed light signal 40, thereby obtaining the modulated seed light signal 43. For simplicity, the modulation may be sinusoidal, although other periodic forms or a pulsing modulation could be used without departing from the scope of the invention. The optical assembly further includes a splitter 42, such as a 50/50 beamsplitter for splitting the modulated seed light signal 43 into two light components 44a and 44b. First and second signal branches 46a and 46b having inputs 48a and 48b are connected to the splitter 42 for respectively receiving the components 44a and 44b of the modulated seed light signal 43 therefrom and have outputs 50a and 50b operatively connectable to the pair of input waveguides 22a and 22b of the balanced detection device 30. In practice, the outputs 50a and 50b can only be connected to the ports S and LO of the OFE, whose internal components lead portions of the light received at each port to one of the optical hybrid mixers 30.

A phase modulator 52 is provided in one of the first and second branches 46a or 46b for varying the phase of the light component 44a or 44b circulating in this branch. The phase modulator may be embodied by a material providing a linear electro-optic effect. Although the phase modulator 52 is shown in the second branch 46b in the illustrated embodiment, connected to the port LO of the OFE, one skilled in the art will readily understand that the phase modulator 52 could alternatively be provided in the first branch 46a, or that in another alternative two phase modulators may be provided, one in each branch.

The optical assembly 37 may also include, in one or both branches 46a and 46b, a variable optical attenuator 56 and a variable delay line 58. A polarisation controller 54 is further preferably provided in the first branch 46a, connected to port S of the OFE. The function of these components will become apparent from the description below of the operation of the apparatus 36.

The apparatus 36 finally includes a controller 60. The controller has an input connectable to the balanced detection device 20 to receive therefrom the differential output current 28, and various outputs connected to the various components of the optical assembly 37. The controller sends appropriate signals to the optical assembly 37 to control the same to perform the steps of the method according to the invention. It will be readily understood that the controller 60 may be embodied by a variety of devices or systems including multiple devices as well known in the art. The controller may also have a user input 62 for receiving instructions from a user, for example through knobs, keys, a keyboard or any other appropriate interface. The user input 62 may alternatively or additionally be connected to other devices providing the controller 60 with control parameters for one or more of the devices of the optical assembly 37.

The operation of the device of FIGS. 8A and 8B to measure the SPRR associated with one of its input waveguides, arbitrarily chosen as the input waveguide 22a of the x polarization stage, will now be explained.

Figure 8A:
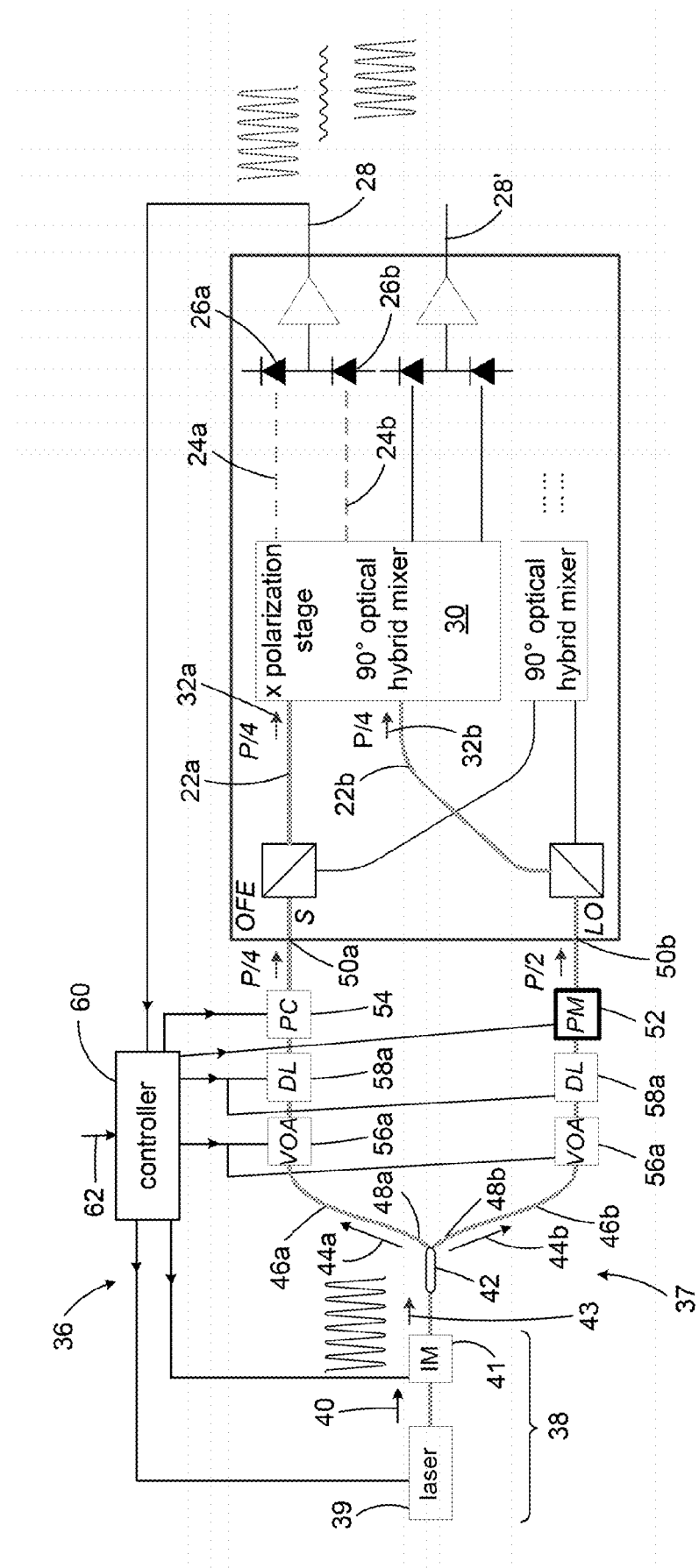
FIG. 8A illustrates an apparatus for measuring the SPRR of an optical front end and the use of this apparatus within a step of injecting dual-port test signals in the optical front end.

FIG. 8A illustrates the setup used to inject the dual-port test signals 32a and 32b into the respective input waveguides 22a and 22b of one of the optical hybrid mixers of the OFE embodying the optical mixing element 30. The laser source 39 generates the seed signal 40 which is then modulated by the amplitude modulator 41, according to a sinusoidal modulation. The resulting modulated seed signal 43 is then separated by the splitter 42 so that two equivalent components of the modulated seed light signal 43 propagate in the first and second branches 46a and 46b. By "equivalent" light components, it is understood that they are coherent and both have the same optical characteristics. Preferably, the initial power in the modulated seed light signal 43 is split evenly between the two light components, although this is not necessary in the illustrated embodiment, as will become apparent from the description below. The first to branch 46a is connected to the port S of the OFE while the second branch 46b is connected to the port LO.

As one skilled in the art will recognize, inside a typical OFE such as the one illustrated herein, the LO port is destined, in usual operation, to receive a reference signal LO of is a known polarization state. Inside the OFE, the LO signal is evenly split into two equal LO signals of orthogonal polarization, each sent as input to one of the x and y polarization stages associated with the optical hybrid mixers. For the execution of the method according to the described embodiment of the invention, it will be assumed that the power launched at port LO is equally split among the two polarization stages. As a result, the power of the signal reaching the optical mixing element 30 of the x polarization stage through the input waveguide 22b will be a fourth of the initial power of the modulated seed light signal 43, also assuming an even split of the modulated seed light signal 43 between the two branches 46a and 46b.

By contrast, the port S is destined, in usual operation, to receive a signal S of unknown polarization. Inside the OFE, the S signal is split into its two orthogonal x and y polarization components, each sent as input to one of the polarization stages associated with the optical hybrid mixers. In normal operation, the power inputted at the port S is randomly distributed between the two polarization stages, this factor having no significant impact of the measure to be made. In the case of the performing of the method according to the present invention, however, it is a condition that the power in both input waveguides 22a and 22b be the same; it is therefore desired to have the power in the input waveguide 22a connected to the port S also correspond to a fourth of the initial power of the modulated seed light signal. This may for example be accomplished by measuring and adjusting the optical power of the test signals at the output 50a and 50b of the first and second branches 46a and 46b, prior to connecting these branches to the OFE. The VOA 56a in the first branch 46a can be used to attenuate the signal therein until the measured output of the first branch 46a correspond to half the output of the second branch 46b. If necessary, another VOA can also be provided in the second branch 46b to perform other adjustments, in which case the overall power in both branches would be diminished accordingly. The outputs 50a and 50b of both branches 46a and 46b can be temporarily connected to appropriate light detectors (not shown) for this purpose. Using this technique, the light injected in the port S therefore has a power P/4, the same as the power in the input waveguide 22b associated with the port LO. In order to ensure that all of the power from the port S goes to the x polarization stage, the method preferably includes using the polarization controller 54 in the first branch 46a. The polarization controller 54 is preferably controlled to adjust the polarisation state of the light in the first branch 46a such that all the light signal is transmitted to the polarisation stage under investigation (the x polarisation stage in the case of the illustration shown in FIG. 8A). The corresponding variation of the differential output current 28 is measured during this process. As previously explained, the differential current varies between two maxima as the phase of the light is varied by the phase modulator 52. As a function of the polarisation, the amplitude of these maxima also varies from a highest value, corresponding to all the light from port S going to the x polarisation stage, to a lowest value (i.e. null) corresponding to all the light from port S going to the y polarisation stage. The polarisation state of the light in the first branch 46a can therefore be fixed by the polarisation controller 54 to a state for which the differential output current is maximum.

The technique described above provides, in the input waveguide 22a and 22b, the dual-port test signals 32a and 32b of equal power required by the method according to embodiments if the invention. The relative phase of these test signals must also be adjusted, sequentially, in order to ensure that light primarily reaches each one of the photodiodes 26a and 26b, in order to measure the corresponding maximized differential output currents $\Delta I_1$ and $\Delta I_2$. This may for example be accomplished by using the phase modulator 52. In the illustrated embodiment, the optical phase of the light component in the second branch 46b is gradually shifted over time with the phase modulator 52 to vary the relative phase $\phi$ so as to produce a differential output current 28 with varying amplitude. The shifting of the relative phase should be performed significantly slower than the amplitude modulation provided by the intensity modulator 41. The variation of the differential output current 28 is measured as a function of the relative phase $\phi$. From equation (6) above, wherein the relative phase corresponds to the difference between the individual phase terms $\phi_s(t) - \phi_{LO}(t)$, it can be seen that the differential output current 28 will theoretically oscillate between two maxima, corresponding to the cases where all the light goes to each photodiode 26a or 26b, respectively. These two maxima therefore provide the value of the dual-port differential output currents $\Delta I_1$ and $\Delta I_2$, respectively.

If the device is well balanced and the photodiodes have responsivities close to the desired values, it may be difficult to differentiate the two distinct maxima in the variation of the differential output current 28 as a function oh the relative phase $\phi$. In such cases, the method may involve simply identifying a single maximum in the variation of the differential output current 28, and setting both maximized differential output currents $\Delta I_1$ and $\Delta I_2$ to this value.

Finally, the method may involve delaying the light component in one or both of the branches 46a and 46b, using a variable delay line 58a or 58b in the corresponding branch 46a or 46b. As the dual-port test signals 32a and 32b are modulated, it may be preferable to ensure that they are fully synchronized at the input of the optical mixing element 30. This synchronization is optimized when the differential delay between both light paths between the splitter 42 and the mixing element 30 is minimized. It can be adjusted by ensuring that the differential output current 28 of maximum amplitude over the phase modulator cycle is the largest possible. The variable delay lines 58a and 58b can therefore be used to vary the relative delay between the dual-port test signals 32a and 32b. A measure of the variation of the differential output current 28 as a function of the delay imposed by the variable delay lines 58a and 58b can provide the delay for which this differential output current 28 is maximum, corresponding to the best achievable synchronization between the two is dual-port test signals. 32a and 32b. For better adjustment, this synchronisation is better performed at a high frequency of the modulation provided by the intensity modulator 41.

The measure of the single-port differential output current $\Delta I_0$ is simpler than the measure of the maximized differential output currents $\Delta I_1$ and $\Delta I_2$, since synchronization is not an issue with a single test signal. Referring to FIG. 8B, there is shown an example of a setup using the same apparatus 36 as the one of FIG. 8A, where the first branch 46a is used to inject the single-port test signal into the port S, and therefore the first waveguide 22a. The polarization controller 54 is kept adjusted in the same manner as for the previous step such that one can still assume that most of the power launched into port S is directed to the polarization stage under test. However, the VOA in the first branch 46a must be adjusted such that the power launched into the OFE is increased by a factor of 4 with respect to the previous step, in order for the single-port test signal 34 to have four times the power of the individual dual-port test signals. The differential output current 28 can then be used directly as the single-port differential output current $\Delta I_0$, and the SPRR calculated using equation (8) above.

It will be readily understood that the SPRR for the second waveguide 22b of the same hybrid mixer 30 can be obtained by following the same procedure with the output one of the first branch and second branches 46a or 46b connected to the port LO, adjusting the optical power and phase accordingly. In addition, the same procedure can be followed using the differential output signal 28' for the other set of photodiodes of the x polarization stage, as well as for both sets of photodiodes of the y polarization stage, yielding the 8 SPRR values associated with the OFE.

Once calculated, the SPRR provides valuable information on the performance of the is tested balanced detection device. In an ideal case, the value of the SPRR should be zero, as the differential output current of the device should be zero if the light from the characterized input waveguide is perfectly split between the two output waveguides and if both photodiodes have exactly the same responsivity. The larger the SPRR is, the greater the imbalance, and the poorer the performance of the balanced detection device.

Dependence of the SPRR on the Modulation Frequency

As aforementioned, the CMRR of balanced photodiodes is usually specified as a function of frequency, since their frequency responses may differ. In the present case, even though equal photodiode responsivities are assumed, the SPRR calculated from expressions (18)-(20) can still present a frequency dependence. This is so because of a possible skew between the propagation times from an input port to each photodiode of a pair of balanced detectors. Rejection of a modulated input power can be degraded, especially if this skew becomes comparable to the characteristic period of the modulation. Thus, the SPRR definition in Eq. (8) is transformed into:

$$SPRR(f) = \frac{|\Delta I_0(f)|}{|\Delta I_1(f)| + |\Delta I_2(f)|}. \tag{21}$$

where it now characterizes the rejection of a sinusoidal power modulation at frequency f. Using the amplitude of the Fourier transform of Eqs. (18) to (20) as the frequency-dependent photocurrents, one obtains:

$$SPRR_{sl}(f) = \frac{4\sqrt{\delta_{sl}^2 + \frac{1}{2}(1-\delta_{sl}^2)(1-\cos(2\pi f \Delta \tau))}}{1+\eta_l+\sqrt{\eta_l(1+\delta_{sl})(1+\delta_{Ll})}+\sqrt{\eta_l(1-\delta_{sl})(1-\delta_{Ll})}}, \tag{22}$$

where $$\Delta \tau = \tau_{s1} - \tau_{s2}, \tag{23}$$

$$\delta_{sl} = \frac{|a_{s1}|^2 - |a_{s2}|^2}{|a_{s1}|^2 + |a_{s2}|^2}, \tag{24}$$

$$\delta_{Ll} = \frac{|a_{L1}|^2 - |a_{L2}|^2}{|a_{L1}|^2 + |a_{L2}|^2}, \tag{25}$$

$$\eta_l = \frac{|a_{L1}|^2 + |a_{L2}|^2}{|a_{s1}|^2 + |a_{s2}|^2}. \tag{26}$$

In Eq. (21), only the amplitude of the complex expressions resulting from the Fourier transforms are taken, which corresponds to considering only the amplitude of the photocurrents and not their phases. The notation in Eq. (22) is also a reminder that such SPRR parameter is required to characterize the rejection of each input power by each pair of balanced detectors. Four parameters are thus required in the case of the hybrid shown in FIG. 6, whereas eight parameters are needed in the case of an OFE with polarization diversity.

Parameters $\delta_{sl}$ and $\delta_{Ll}$ represent the imbalance in the optical power distribution among both detectors of channel I for a signal coming from input ports S and LO respectively. Ideally, an even split is desired corresponding to $\delta_{sl}$=0. An imbalance of 2% corresponds to a situation where photodiodes 1 and 2 receive the optical power in proportion of 51% and 49% respectively. The delay $\Delta\tau$ represents the skew between the two output paths and should ideally be zero.

Figure 7:
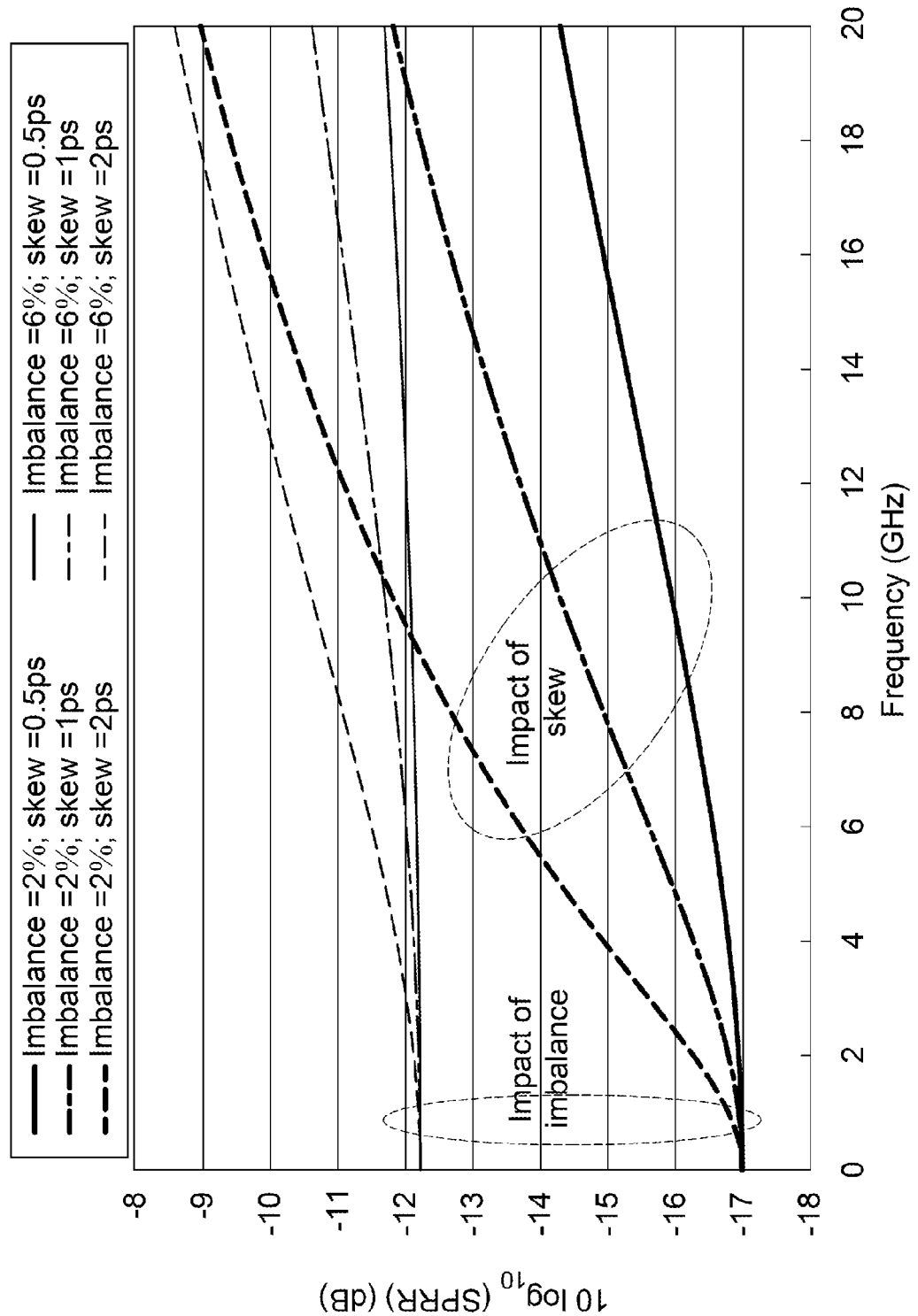
FIG. 7 is a graph showing SPRR as a function of the frequency for different imbalance and skew, according to simulations.

In FIG. 7, the SPRR is shown on a log scale as a function of frequency, as calculated with Eq. (22) for different combinations of skew $\Delta\tau$ and imbalance $\delta_{sl}$. The SPRR is found to depend very weakly on $\delta_{Ll}$ and $\eta_l$, which have been set to 0 and 1 respectively in the calculations shown in FIG. 7. At low frequency, only the imbalance impacts on the SPRR, whereas the skew is responsible for the frequency dependence of the SPRR. As seen in FIG. 7, the 90° optical hybrid mixer has a strong impact on the level of rejection achieved with the balanced detection.

EXPERIMENTAL RESULTS

The following describes a particular experimental setup constructed to test the method proposed for the measurement of the SPRR. The following can also be viewed as a preferred embodiment of an apparatus implementing the method described above.

The method described above was adapted to a single-polarization OFE such as illustrated in FIG. 6. A Lightwave Components Analyzer (LCA) model 8703A from Agilent fed with a DFB laser provided the intensity modulated optical signal at a frequency scanned from 130 MHz to 20 GHz together with the detection system.

Figure 9:
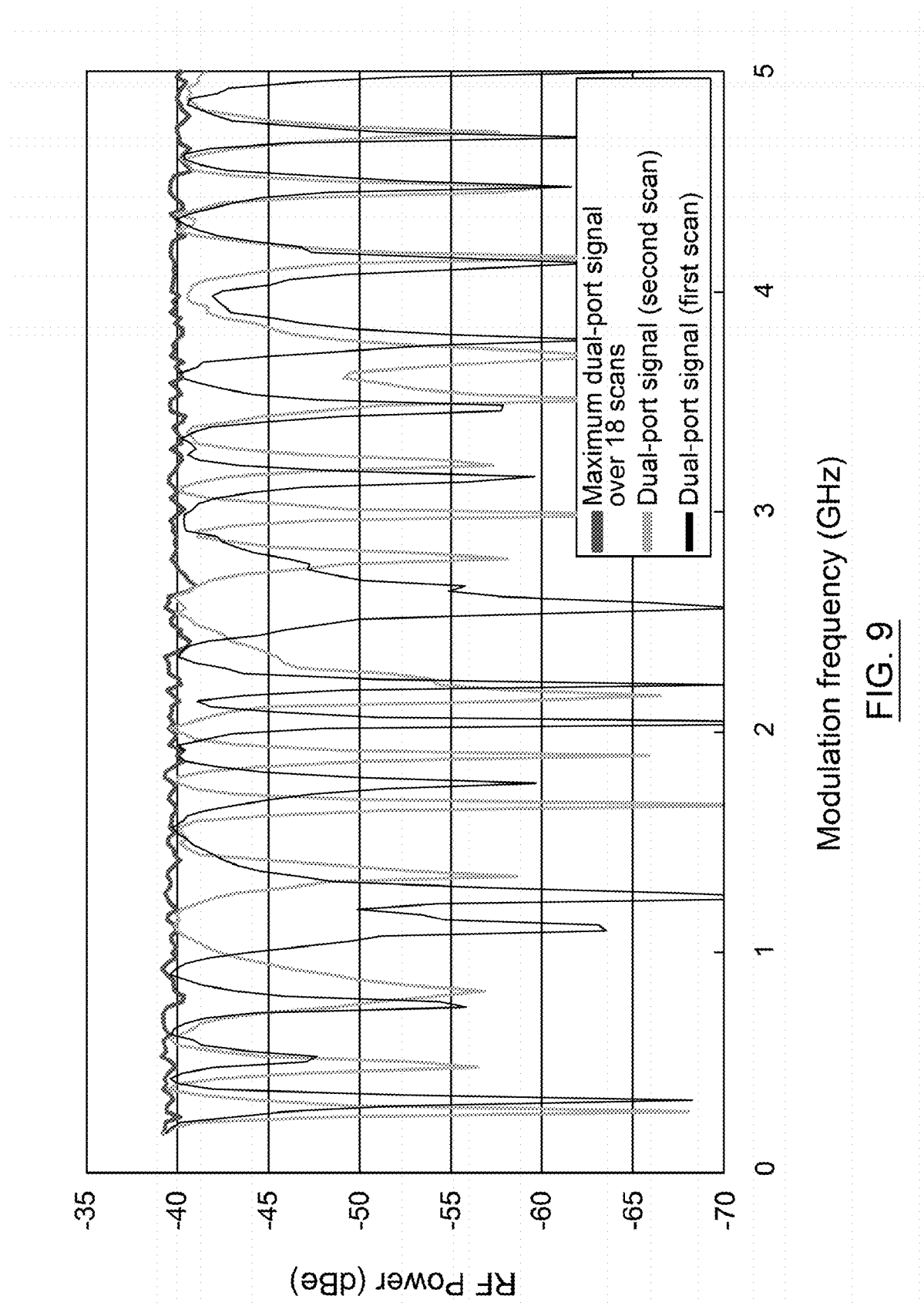
FIG. 9 is a graph showing the RF power of the differential output current as a function of the modulation frequency using the configuration in FIG. 8A for two successive scans and maximum curve over 18 successive scans.
Figure 10A:
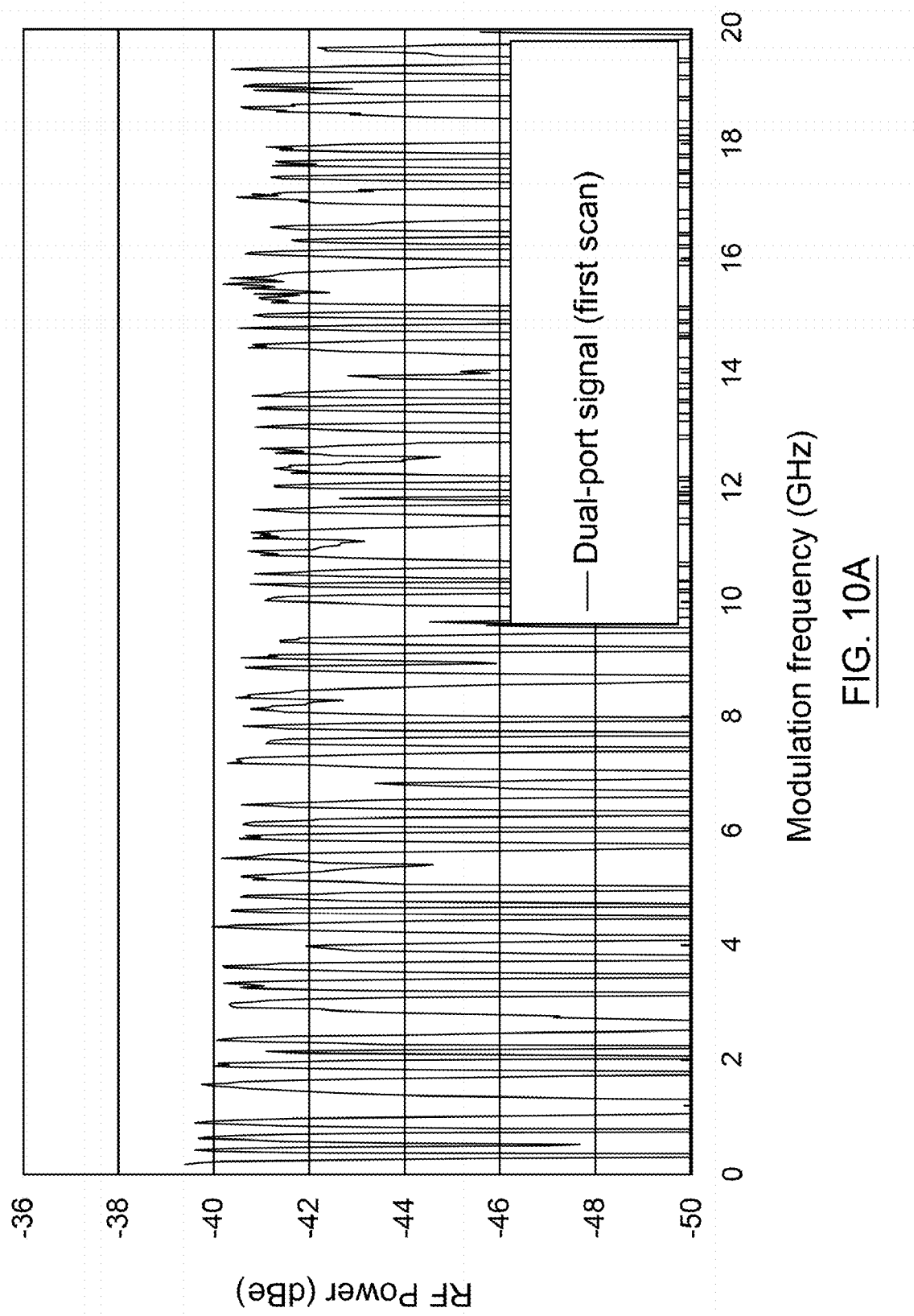
FIGS. 10A and 10B are graphs showing the RF power of the differential output current as a function of the modulation frequency using the configuration in FIG. 8A for a single scan (FIG. 10A) and maximum curve over 18 successive scans (FIG. 10B), and a comparison with the RF power measured when only one photodetector is connected (FIG. 10B).
Figure 10B:
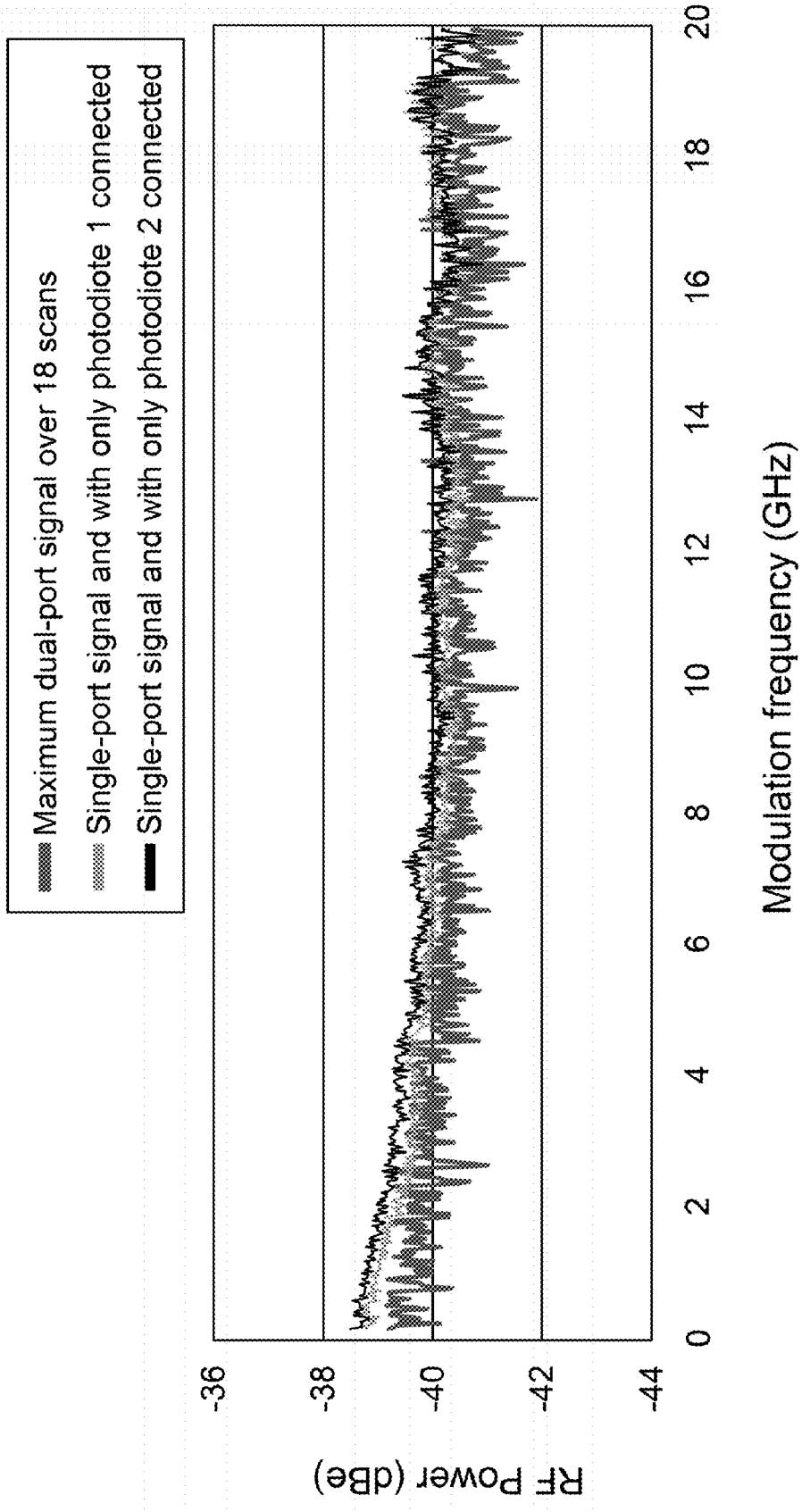

The configuration in FIG. 8a was built using a 3 dB fiber coupler, two VOAs, and a lithium niobate phase modulator. Fiber patch cords of adjusted lengths were used as delay lines. The FSR of the interferometer formed by the measurement setup was measured to be 250 GHz, thus corresponding to a differential delay of 4 ps between the two arms. Using the VOAs, the optical powers were adjusted to 17 μW in both the S and LO ports. The phase modulator was fed with a triangular wave at a frequency of 1 Hz and an amplitude slightly larger than required to produce a phase modulation of ±π. A polarization controller on arm S was adjusted to maximize the interference signal. The phase modulation was not synchronized with the frequency scanning of the LCA. Accordingly, maximum output signals occurred at different frequencies during successive scans. FIG. 9 shows the RF power of the measured output modulated signal as a function of the frequency during two successive scans, as well as the curve of maximum values over 18 successive scans. FIG. 9 shows the frequency response over a limited range of 5 GHz to better show the difference from scan to scan. In FIGS. 10A and 10B, the whole frequency response is shown from 0 to 20 GHz for a single scan as well as for the maximum over 18 scans. Although the phase of the measured modulation could serve at distinguishing between the strong photocurrents $\Delta I_1$ and $\Delta I_2$, only the maximum between these two was selected and used as the denominator of the SPRR.

Figure 8B:
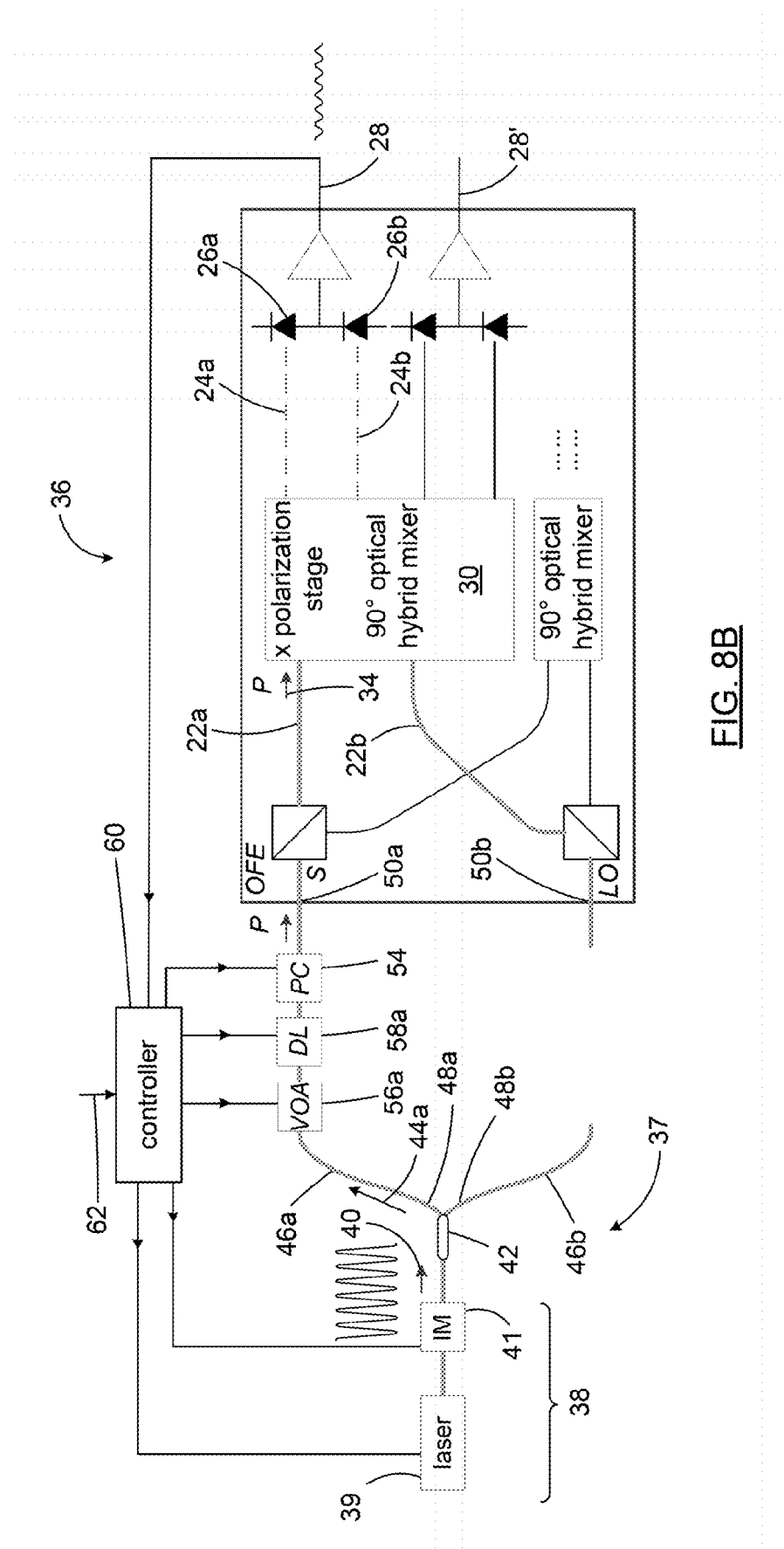
FIG. 8B illustrates the use of the same apparatus within a step of injecting a single-port test signal in the optical front end.

Arm LO of the interferometer was disconnected as per FIG. 8b. The VOA in arm S was adjusted to 68 µW in port S, thus a factor 4 larger than the power used in the dual-port measurement. The resulting output signal RF power as a function of the modulation frequency is shown in FIG. 11 and was used as the numerator of the SPRR.

Figure 11:
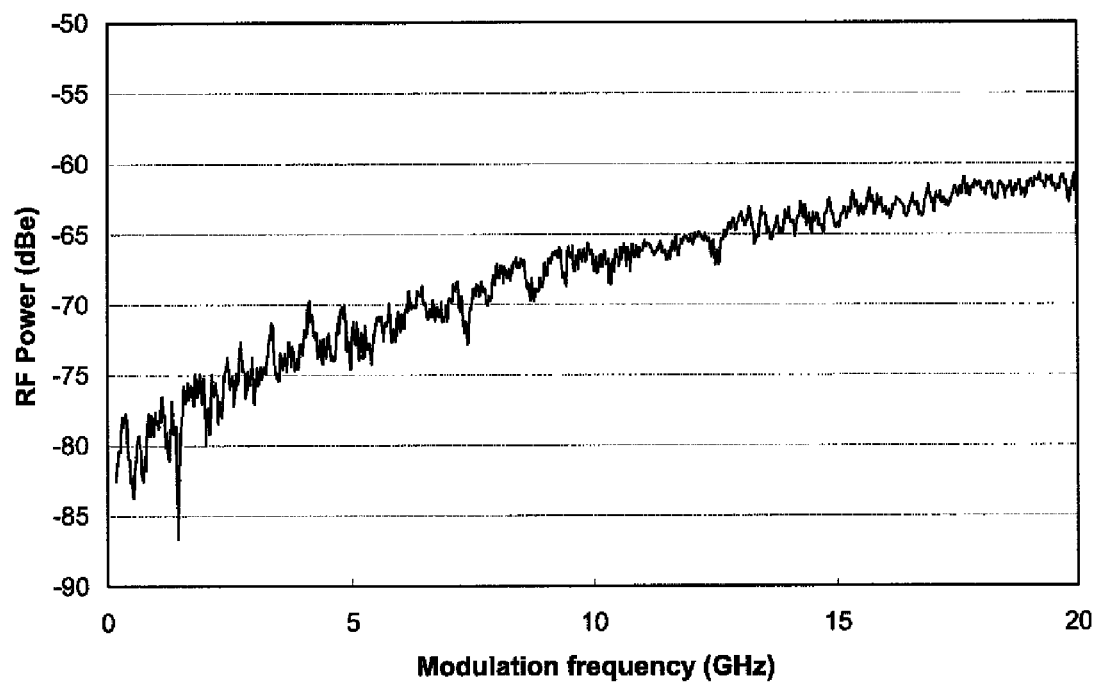
FIG. 11 is a graph showing the RF power of the differential output current as a function of the modulation frequency using the configuration in FIG. 8B.
Figure 12:
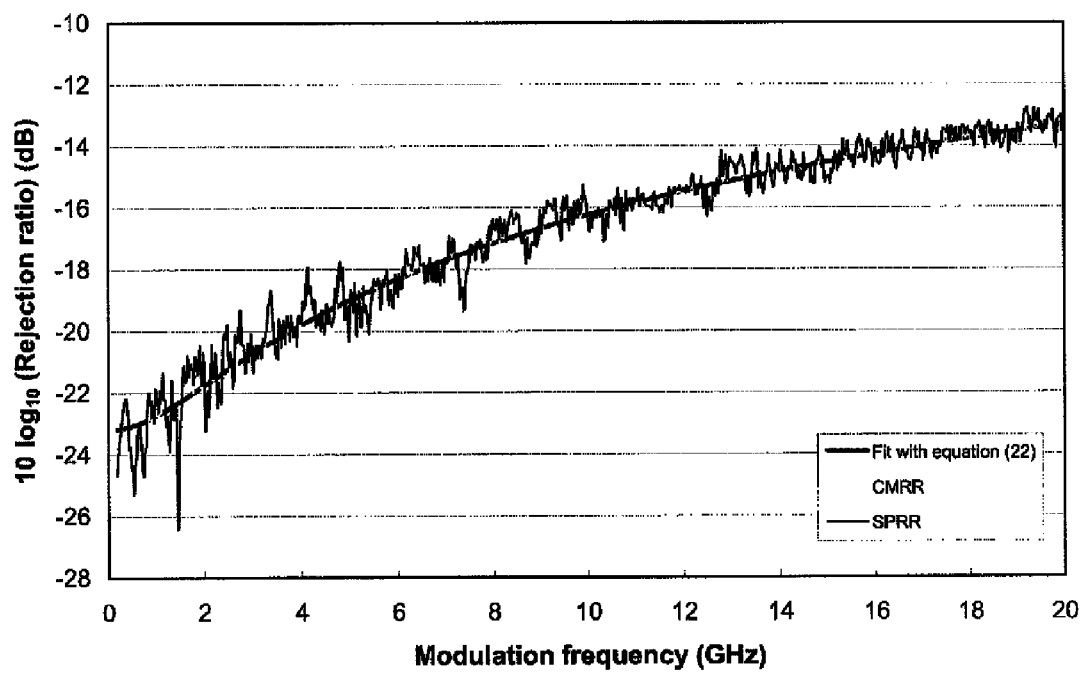
FIG. 12 is a graph comparing the measured SPRR, the theoretical SPRR and the measured CMRR as a function of the frequency.

Shown in FIG. 12 is the SPRR taken as the ratio of the curve in FIG. 11 and twice the maximum curve in FIG. 10B, together with a fit to Eq. (22). The fit provided a skew $\Delta E = 0.74$ ps and an imbalance $\delta_{sf} = 0.48\%$ ($\eta_I$ and $\delta_{LI}$ were set to 1 and 0 respectively). For comparison with the CMRR, photocurrents $I_1$ and $I_2$ on individual photodiodes were also measured using a successive disconnection of the fiber-connected photodiodes in the setup in FIG. 8b. The RF powers measured under this single-port illumination (and single-photodiode as well) are also shown in FIG. 10B. The sum of these two photocurrents was used as the denominator of the CMRR, which is also shown in FIG. 12. The SPRR, a parameter that can be measured end-to-end on the OFE provides virtually the same information as the well known CMRR which requires disconnection inside the OFE to access the photocurrents of individual photodiodes. It should be noted also that the CMRR and SPRR shown in FIG. 12 contains the same noise, which is mainly determined by their common numerator, i.e. the signal shown in FIG. 11. The good match with the theoretical expression is an indication that in this case, the performance of the balanced detection was mainly determined by the characteristics of the 90° optical hybrid mixer.

It will be understood by one skilled in art that in above embodiments, manual disconnections which are required to reconfigure the system into the single-port or dual-port illumination configuration can be done using optical switches. All the components involved in the instrumental setup or stand-alone instrument, such as optical switches, phase modulator, intensity modulator, laser, variable optical attenuator, delay lines, control electronics for example, can all be automated and controlled using a micro-controller or similar device.

Advantageously, by way of example, methods and instruments according to embodiments of the invention can be used to qualify coherent receivers making use of balanced detection or more generally any type of optical receivers making use of balanced detection. Such qualification can assess whether the receiver meets the specifications for the SPRR (pass/fail test) or any other parameter that can be deduced from the SPRR (imbalance, skew, frequency response, etc.). In addition, the measurement the SPRR gives information on the imbalance (difference in electrical current generated in each photodiode due to optical loss, responsivity, polarization dependent loss, etc.) and skew (difference in optical path length from the input to each photodetector). The measurement can thus serve to trim either of these two parameters or both and improve the performance of the balanced receiver. The receiver can afterwards be qualified as described in the previous point.

However, as will be clearly understood, embodiments of the invention could be implemented in a different context and are not restricted to these two uses only.

Of course, numerous modifications could be made to the embodiments described above without departing from the scope of the present invention.

The invention claimed is:

1. A method for measuring a factor characterizing a balanced detection device, said balanced detection device including a pair of input waveguides, a pair of output waveguides respectively connected to a pair of photodiodes coupled to generate a differential output current, and an optical mixing element coupling light between the input waveguides and the output waveguides, the method comprising the steps of:
    a) injecting, via an optical assembly, a pair of modulated dual-port test signals in the pair of input waveguides, respectively, the dual-port test signals having a same optical power and a relative phase φ therebetween;
    b) measuring the differential output current of said photodiodes for values of said relative phase φ corresponding to light primarily reaching each one of the photodiodes, thereby obtaining maximized differential output currents $\Delta I_1$ and $\Delta I_2$;
    c) injecting, via said optical assembly, a modulated single-port test signal in a single one of the input waveguides, the single-port test signal having an optical power corresponding to four times the optical power of each of the dual-port test signals, and measuring the corresponding differential output current, thereby obtaining a single-port differential output current $\Delta I_0$; and
    d) calculating a single-port rejection ratio SPRR corresponding to the ratio of the single-port differential output current $\Delta I_0$ to the sum of the maximized differential output currents $\Delta I_1$ and $\Delta I_2$.

2. The method according to claim 1, wherein step b) comprises the substeps of:
    i. gradually shifting a phase of at least one of the dual-port test signal to vary the relative phase φ over time;
    ii. measuring a variation of the differential output current as a function of the relative phase;
    iii. identifying two distinct maxima in said variation of the differential output current; and
    iv. setting the dual-port differential output currents $\Delta I_1$ and $\Delta I_2$ to said maxima, respectively.

3. The method according to claim 1, wherein step b) comprises the substeps of:
    i. gradually shifting a phase of at least one of the dual-port test signal to vary the relative phase φ over time;
    ii. measuring a variation of the differential output current as a function of the relative phase;
    iii. identifying a single maximum in said variation of the differential output current; and
    iv. setting both of the dual-port differential output currents $\Delta I_1$ and $\Delta I_2$ to said single maximum.

4. The method according to claim 1, comprising a preliminary step prior to step a) of generating, via said optical assembly, a seed light signal and modulating the same, thereby obtaining a modulated seed signal, and wherein:
    steps a) comprise splitting the modulated seed light signal into two components thereof and using said components as the pair of dual-port test signals; and
    step c) comprises using the modulated seed light signal as the single-port test signal.

5. The method according to claim 1, wherein step a) comprises varying a polarisation state of at least one of said dual-port test signals over time, measuring a variation of the differential output current as a function of said polarisation state, and fixing said polarisation state of at least one of said dual-port test signals to a setting for which said differential output current is maximum.

6. The method according to claim 1, wherein steps a) and c) each comprises measuring and adjusting the optical power of the corresponding test signals prior to injecting the same into the input waveguides.

7. The method according to claim 1, wherein step a) comprises delaying at least one of said dual-port test signals, thereby varying a relative delay between said dual-port test signals, measuring a variation of the differential output current as a function of said relative delay, and fixing said relative delay to a value for which said differential output current is maximum.

8. The method according to claim 1, comprising performing, sequentially, the injecting of steps c) in each of said input waveguides, and performing the calculating of step d) using the single-port differential output current measured at each performing of step c), thereby obtaining a value for the SPRR associated with each of said input waveguides.

9. The method according to claim 1, wherein said balance detection device comprises a plurality of said pairs of input waveguides, output waveguides and photodiodes, the steps of said method being performed so as to obtain a value for the SPRR associated with each of the input waveguides of each of said pairs thereof.

10. The method according to claim 1, further comprising performing said steps a) to d) for a plurality of repetitions using test signals, and changing a modulation frequency of said test signals for each repetition, thereby characterizing a modulation frequency dependence of the SPRR.

11. An apparatus for measuring a factor characterizing a balanced detection device, said balanced detection device including a pair of input waveguides, a pair of output waveguides respectively connected to a pair of photodiodes coupled to generate a differential output current, and an optical mixing element coupling light between the input waveguides and the output waveguides, the apparatus comprising:

an optical assembly comprising a light source assembly for generating a modulated seed light signal, a splitter for splitting the modulated seed light signal into two light components thereof, first and second signal branches having inputs connected to the splitter for respectively receiving the components of the modulated seed light signal therefrom and outputs operatively connectable the pair of input waveguides of the balanced detection device, said optical assembly further comprising a phase modulator provided in one of the first and second branches for varying a phase of the light component therein; and a controller connectable to the balanced detection device to receive therefrom the differential output current, said controller controlling the optical assembly to perform the following steps:

a) injecting a pair of modulated dual-ports test signals in the pair of input waveguides, respectively, the dual-ports test signals having a same optical power and a relative phase ϕ therebetween;

b) measuring the differential output current of said photodiodes for values of said relative phase ϕ corresponding to light primarily reaching each one of the photodiodes, thereby obtaining maximized differential output currents $\Delta I_1$ and $\Delta I_2$;

c) injecting a modulated single-port test signal in a single one of the input waveguides, the single-port test signal having an optical power corresponding to four times the optical power of each of the dual-port test signals, and measuring the corresponding differential output current, thereby obtaining a single-port differential output current $\Delta I_0$; and d) calculating a single-port rejection ratio SPRR corresponding to the ratio of the single-port differential output current $\Delta I_0$ to the sum of the maximized differential output currents $\Delta I_1$ and $\Delta I_2$.

12. The apparatus according to claim 11, wherein the light source assembly includes a laser source generating a seed light signal and an amplitude modulator downstream the laser source for modulating said seed light signal, thereby obtaining the modulated seed light signal.

13. The apparatus according to claim 11, wherein, to perform step b) the controller controls the phase modulator gradually shifting a phase of at least one of the dual-port test signal to vary the relative phase ϕ over time, receives a variation of the differential output current as a function of the relative phase, identifies two distinct maxima in said variation of the differential output current, and sets the dual-port differential output currents $\Delta I_1$ and $\Delta I_2$ to said maxima, respectively.

14. The apparatus according to claim 11, wherein, to perform step b) the controller controls the phase modulator gradually shifting a phase of at least one of the dual-port test signal to vary the relative phase ϕ over time, receives a variation of the differential output current as a function of the relative phase, identifies a single maximum in said variation of the differential output current and sets both of the dual-port differential output currents $\Delta I_1$ and $\Delta I_2$ to said single maximum.

15. The apparatus according to claim 11, wherein said optical assembly comprises a polarisation controller in at least one of said signal branches.

16. The apparatus according to claim 11, wherein said optical assembly comprises a variable optical attenuator provided in at least one of said signal branches.

17. The apparatus according to claim 11, wherein said optical assembly comprises a variable delay line in at least one of said signal branches.

* * * * *